Patented July 8, 1941

2,248,432

UNITED STATES PATENT OFFICE 2,248,432

METHOD OF MAKING VENEERED VITRIFIED PRODUCTS

Donald E. Lower, Lansdale, Pa.

No Drawing. Original application August 29, 1936, Serial No. 98,596. Divided and this application February 21, 1938, Serial No. 191,825

10 Claims. (Cl. 25—156)

This application is a division of my pending application Serial No. 98,596 on a Method of making vitrified products.

A primary object of the invention is to provide a novel method of manufacturing a coating or veneer for tiles, brick work, and blocks.

Another object of the invention is to provide a composition of matter which is vitrifiable and adapted to be applied as a veneer to tile or the like prior to vitrification thereof.

A further object of the invention is to provide a method of manufacturing veneered vitrified products which may be carried out by employing clays containing impurities formerly regarded as being impractical because detrimental to the finished product.

A still further object of the invention is to provide a composition of matter and a method of utilizing the same for producing facings or veneers of selected colors by the use of clays obtained from certain localities or by the selection of certain inorganic coloring agents which when not inherent in local clays can be derived from other sources and added to the clay mixture.

A still further object of the invention is to provide a method of making veneered vitrified products which may be carried out by a simple ball mill or wet-pan grinding and subsequent pugging, without the necessity of utilization of a filter press after the liquids have been added to and mixed with the clay.

To the attainment of the foregoing and other objects, the invention preferably comprises the various materials and method steps to be hereinafter more fully described and claimed.

In carrying out the invention by the preferred method, vitrifiable clays having the properties desired to be obtained in the final product are selected and ground in a ball mill. During this step in the process, complete commingling of the different clays is obtained. After grinding, the dry vitrifiable material is removed from the ball mill and placed in a pug mill. Water and phosphoric acid are then added and the mass is pugged. The pugged mass is extruded from pug mill and applied or slipped in a plastic state as a coating on previously formed unvitrified blocks or the like. After the coating or veneer and the block to which it has been applied have dried, the veneered blocks are placed in a suitable kiln and fired until the desired degree of vitrification has taken place.

The veneer can be given almost any desired color effect by either judicious selection of clays having inherent coloring matter or by mixing with the clays certain inorganic compounds, as fully elucidated in the parent application. If the latter method is used, the inorganic coloring matter should preferably be added to the vitrifiable clays before the dry mass is ground in the ball mill, in order to obtain thorough commingling of the coloring matter and consequent uniformity of coloring throughout the veneer after vitrification.

In the course of experimentation with the process of the present invention, it was found that clays in which the content ranged from 15% to 35% of aluminum and from 50% to 70% of silica, when mixed with a certain per cent of phosphoric acid in syrupy form, produce a mass having the high degree of plasticity, best suited for making vitrified products. The phosphoric acid not only produces this result, but permits the use of clays containing impurities, such as magnesium, calcium, and zinc, without in any way affecting the quality of the final product. Such clays which were formerly considered unfit for use in the formation of vitrified products can now be used with my process and, consequently, the present development constitutes a decided step forward in increasing the commercial practicability of clay vitrification.

The amount of phosphoric acid required to be mixed with the vitrifiable clays necessarily varies according to the chemical composition of the clays used and the concentration of the phosphoric acid in the acid solution. However, it has been found that by using from 3 to 10 gallons of acid to a ton of the clay mixture and sufficient water to form between 15 and 30% of the mass, excellent results can be obtained. The cheap by-product phosphoric acid of about 50% concentration is adequate for the process. Water is added in order to give plasticity to the mass and formerly formed a much larger portion of the mass. By using the acid, the mass is made more plastic. This is a very desirable result as it facilitates the forming or handling of the mass after pugging.

An important result of the use of the phosphoric acid in clay mixture as a veneer for bricks and the like is the decrease in the temperature required to obtain complete vitrification of the veneered portion or face thereof and partial or complete vitrification of the entire mass. Complete vitrification of the veneer and the unvitrified brick to which it is applied occurs at between 1800 and 2200 degrees F. This is considerably lower than the temperature required to vitrify clays with which phosphoric acid has not been mixed.

Finally, one of the most important results obtained by the use of phosphoric acid is the almost entire lack of shrinkage of the veneer during firing. This as yet unexplained phenomenon is extremely important, as normally veneer will shrink more on firing than the material to which it is applied due to the differences in mass and, consequently, checking of the veneer will follow. The checking naturally exposes a portion of the surface of the brick, leaving an unsightly brick of little, if any, greater utility than an unveneered brick. As contrasted with the failure of normal veneers to accomplish their intended purpose, an acid containing veneer covers the brick or the like to which it has been applied with a smooth unbroken surface after vitrification.

While I have described certain clays and certain variable proportions of phosphoric acid and water, it should be understood that the disclosure is merely an exemplification of the principle involved and that the right is reserved to make all such changes as do not constitute a departure from the spirit of the invention or the scope of the appended claims.

Having now fully described the invention, I claim:

1. The method of making a veneer for tiles and the like comprising mixing selected ground vitrifiable clays solely with water and phosphoric acid, said mixture being adapted to be applied to a surface of a tile before the tile is fired.

2. The method of making a veneer for the tiles and the like comprising grinding together a selected blend of vitrifiable clays, adding solely water and phosphoric acid thereto and thoroughly mixing the resultant mass.

3. The method of making a veneer for tiles and the like comprising grinding together a selected blend of vitrifiable clays having selected color characteristics, adding solely water and phosphoric acid to the ground clays, pugging the mixture and extruding the same.

4. The method of making a veneer for tiles and the like comprising dry grinding a blend of selected vitrifiable clays together with an inorganic coloring material, adding solely water and phosphoric acid to the ground material, pugging the mass to obtain homogeneity and extruding the mass.

5. The method of making a veneer for tiles and the like, comprising making a mix of a blend of selected vitrifiable ground clays having selected color characteristics, adding solely water and a relatively small proportion of phosphoric acid to the dry ground material to render the same plastic, pugging the mass to effect complete commingling of the ingredients thereof and extruding the mixed material.

6. A material for veneering unvitrified tiles or bricks, comprising a pugged mixture consisting of a blend of selected vitrifiable clays, possessing selected color characteristics, and a relatively small proportion of phosphoric acid, and sufficient water to render the mixture plastic whereby it may be applied to one or more surfaces of an unvitrified tile or brick to unite therewith when the veneered tile or brick is fired.

7. The method of making a veneer for tiles and the like comprising mixing with a blend of vitrifiable clays, having selected color characteristics, solely a solution consisting of water and phosphoric acid, pugging the mixture and extruding the same.

8. The method of making a veneer for tiles and the like comprising mixing selected vitrifiable clays solely with an aqueous solution of phosphoric acid.

9. The method of making a veneer for tiles and the like comprising mixing selected vitrifiable clays with an inorganic coloring agent, and adding to and mixing with said mixture solely water and phosphoric acid, said veneer being adapted to be applied to a surface of a tile and fired to vitrification on firing of said tile.

10. A veneer for tiles or bricks consisting of a mixture of vitrifiable clays, water, and phosphoric acid, adapted to be applied to the surface of an unvitrified tile or brick and subsequently bonded thereto when said veneered tile or brick is fired.

DONALD E. LOWER.